Figure 1:
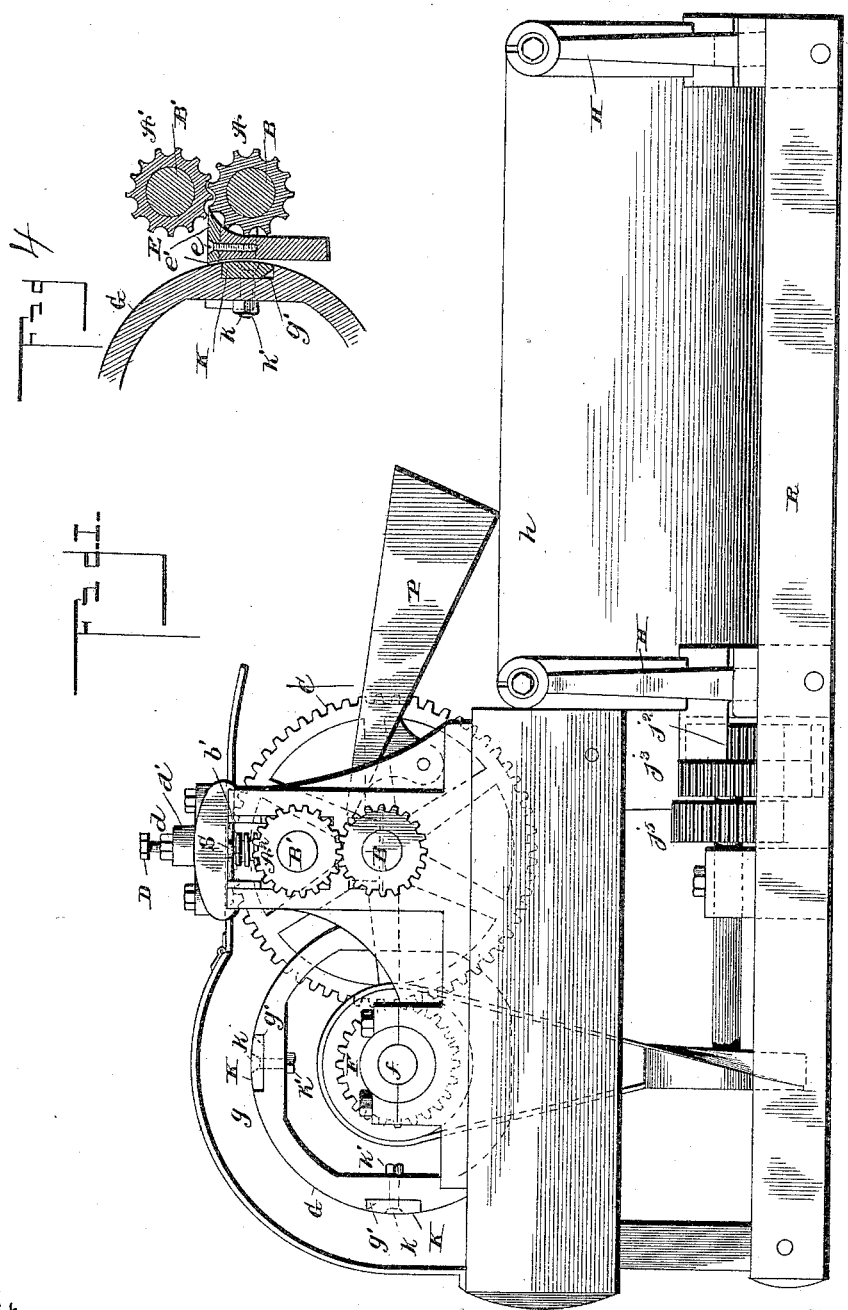

(No Model.) 6 Sheets—Sheet 1.

J. A. WEBBER.
CORN HUSKING AND FODDER CUTTING MACHINE.

No. 446,747. Patented Feb. 17, 1891.

Witnesses
John Imirie
Emma Arthur

Inventor
Josiah A. Webber
By his Attorneys, Knight Bros.

(No Model.) 6 Sheets—Sheet 2.
J. A. WEBBER.
CORN HUSKING AND FODDER CUTTING MACHINE.

No. 446,747. Patented Feb. 17, 1891.

WITNESSES:

INVENTOR
Josiah A. Webber
BY
Frost & Coe
ATTORNEYS (No Model.) 6 Sheets—Sheet 3.
J. A. WEBBER.
CORN HUSKING AND FODDER CUTTING MACHINE.
No. 446,747. Patented Feb. 17, 1891.
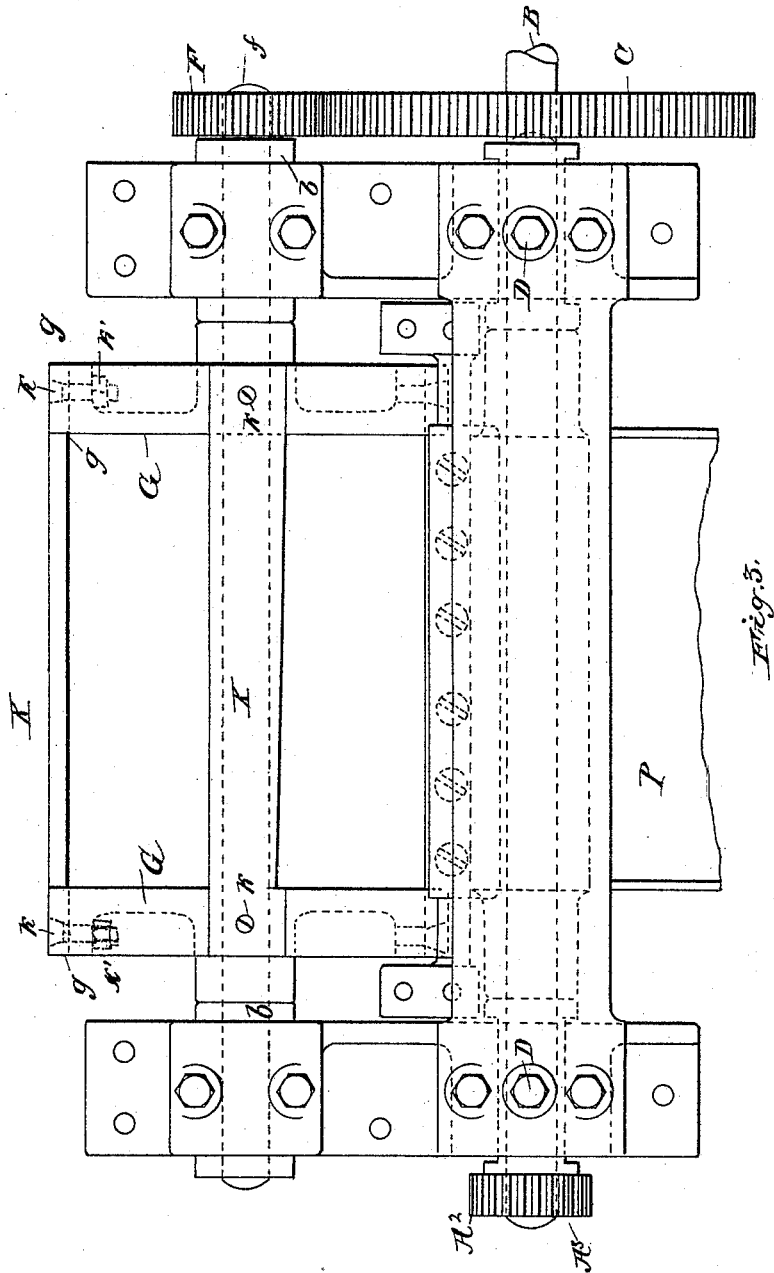
WITNESSES:
INVENTOR
Josiah A. Webber
BY
Frost & Coe
ATTORNEY (No Model.) 6 Sheets—Sheet 4.
J. A. WEBBER.
CORN HUSKING AND FODDER CUTTING MACHINE.
No. 446,747. Patented Feb. 17, 1891.
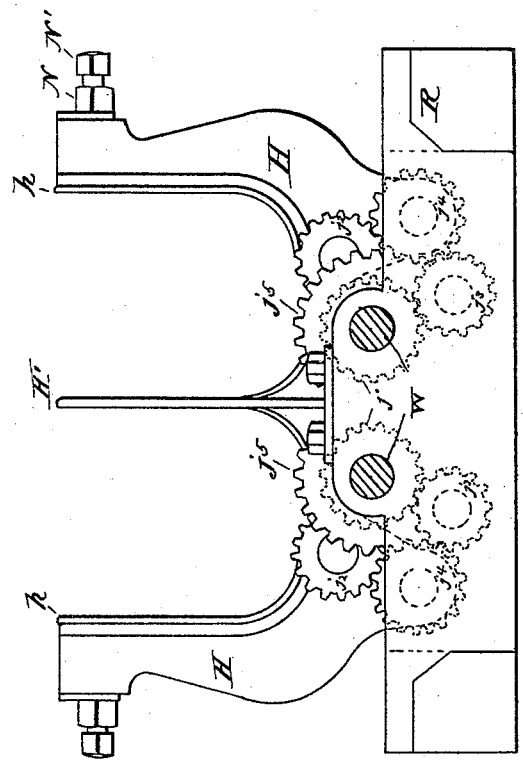
WITNESSES:
INVENTOR
Josiah A. Webber
BY
ATTORNEYS (No Model.) 6 Sheets—Sheet 5.

J. A. WEBBER.
CORN HUSKING AND FODDER CUTTING MACHINE.

No. 446,747. Patented Feb. 17, 1891.

WITNESSES:
INVENTOR
Josiah A. Webber
BY
Frost & Coe
ATTORNEYS (No Model.)  6 Sheets—Sheet 6.

J. A. WEBBER.
CORN HUSKING AND FODDER CUTTING MACHINE.

No. 446,747.  Patented Feb. 17, 1891.

WITNESSES:  INVENTOR
  Josiah A. Webber
BY
  Frost & Coe
  ATTORNEYS

UNITED STATES PATENT OFFICE.

JOSIAH A. WEBBER, OF BROOKLYN, NEW YORK.

CORN-HUSKING AND FODDER-CUTTING MACHINE.

SPECIFICATION forming part of Letters Patent No. 446,747, dated February 17, 1891.

Application filed August 14, 1889. Serial No. 320,718. (No model.)

*To all whom it may concern:*

Be it known that I, JOSIAH A. WEBBER, a citizen of the United States, residing in the city of Brooklyn, county of Kings, and State of New York, have invented a new and useful Improved Corn-Husking and Fodder-Cutting Machine, of which the following, taken in connection with the accompanying drawings, is a full, clear, and accurate description.

The corn-husking portion of my invention consists, essentially, of one or more pairs of husking-rollers, each of which is formed with alternate concave and convex sections for the length of the rollers, the rollers of each pair being so arranged with relation to each other that in action the concave sections of the one roller will mesh into the convex sections of the other roller. One of the rollers of each pair is preferably made of case-hardened steel, and the other roller of each pair is covered with rawhide molded and formed on the shaft by hydraulic pressure. One roller of each pair is placed in stationary bearings, while the other roller is placed in lever-bearings. The two rollers are in use properly geared together and placed on an incline, so that the ears run down upon such rollers as the husks are pulled off.

Another portion of my invention consists in casting the lever-bearings in which one of each pair of rollers turns with integral side guards for giving uniformity of movement and steadiness to the rollers throughout the entire length of the working part of the rollers.

The remaining general portion of my invention relates to the fodder-cutting device, which consists, essentially, of a pair of fluted feed-rollers, in combination with a revolving wheel holding knives or cutters placed at proper intervals and a stationary cutter attached to or forming the edge of a table or plane surface for the support of the stalks.

My invention as a whole consists of an automatic machine whereby the stalks with unhusked ears of corn attached are fed to the feed-rollers and there the stalks separated from the unhusked corn, the stalks passing to and being cut to any desired fineness by the cutting device, while the unhusked ears of corn are simultaneously passed to the husking-rollers and there husked.

Figure 2:
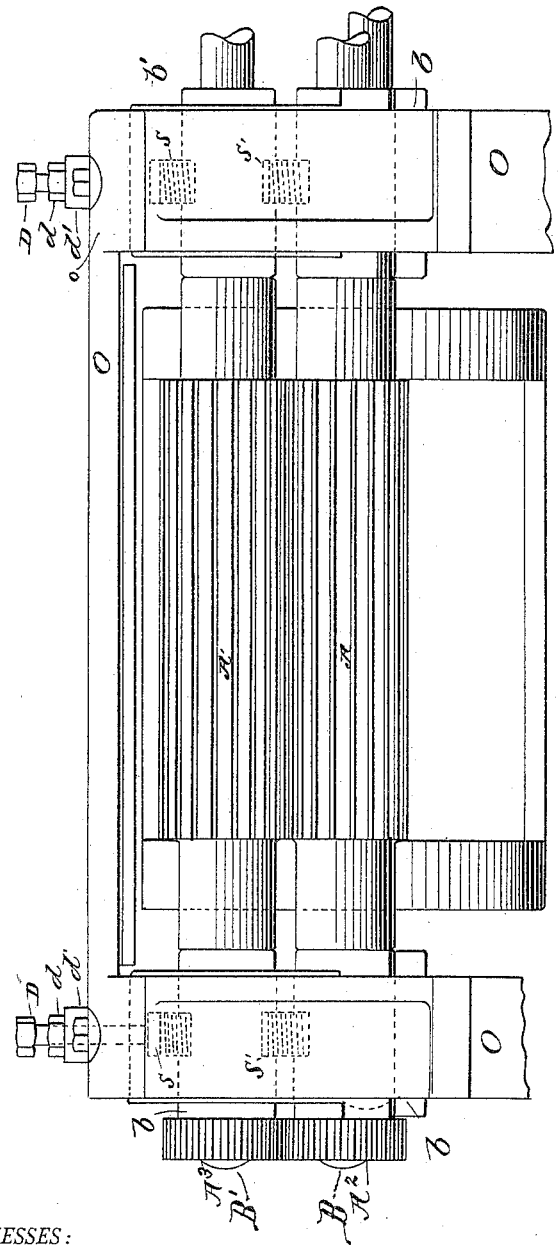
Figure 6:
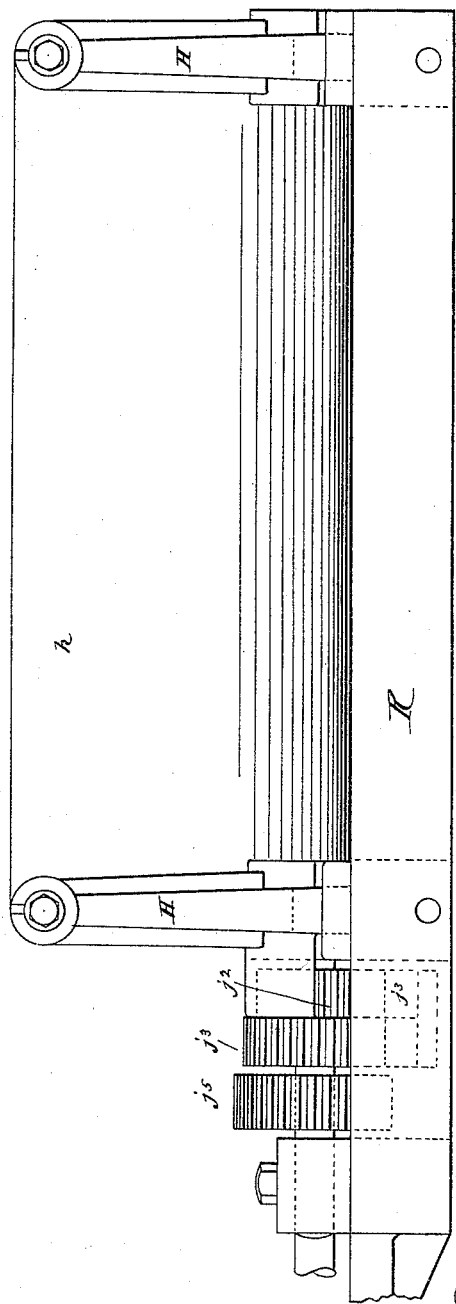
Figure 7:
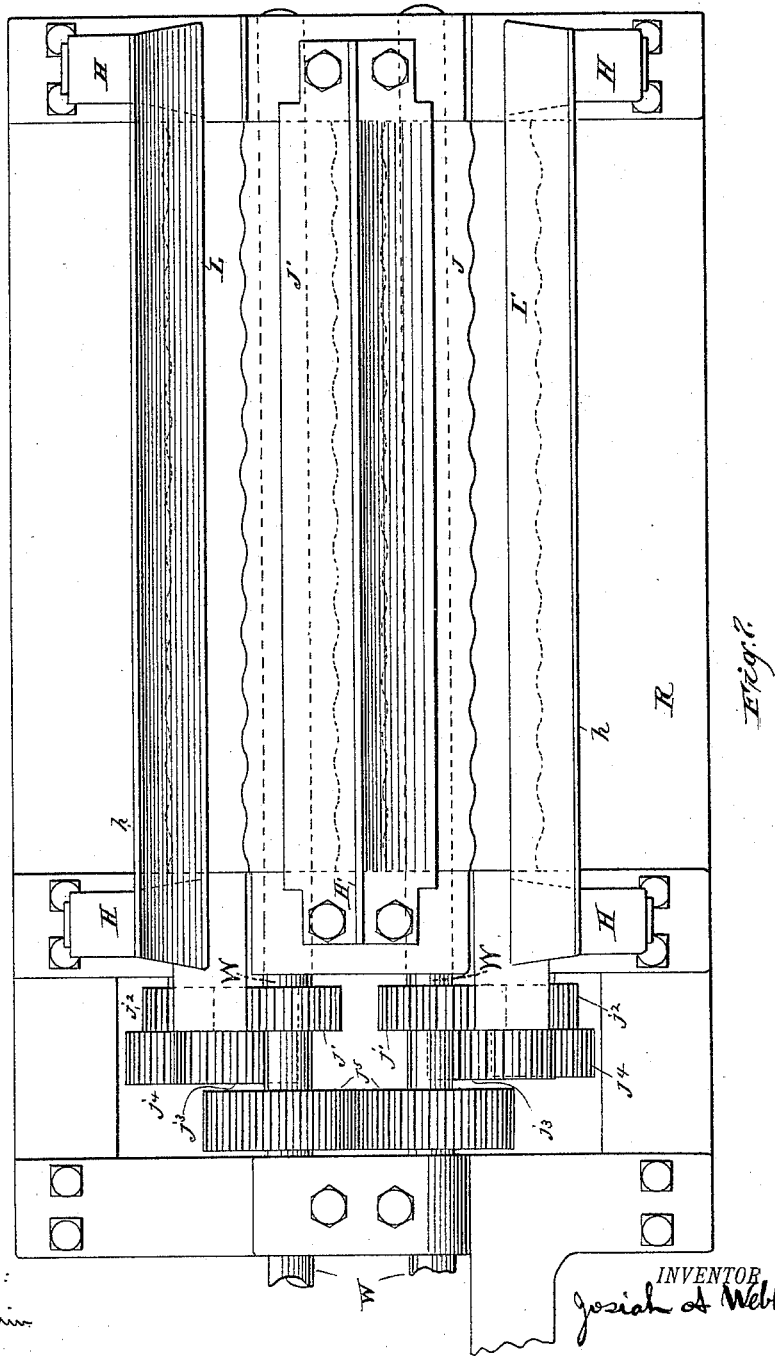

In the drawings, Figure 1 shows a side elevation of my invention. Fig. 2 is a plan view of the cutting feed-rollers and their gearing. Fig. 3 is a front view of the cutter-heads, showing the means by which the knives or cutters are attached thereto. Fig. 4 is a sectional view of the revolving and stationary cutting device and feed-rollers. Fig. 5 is an end view of the frame and gearing. Fig. 6 shows a detailed view of the lever-arms in which the shifting husking-rollers are hung, with the side guards and said lever-arms cast in one piece. Fig. 7 shows a view of the husking-rollers with their gearing.

That part of my invention relating to the fodder-cutting device is shown in Figs. 1, 2, 3, and 4. In these figures is shown the axle B, upon which is mounted the feed-roller A, fluted longitudinally and corresponding with and fitting to a similar fluted feed-roller $A'$, mounted on the axle $B'$. The axles B and $B'$ are held in proper journal-boxes $b$ and $b'$, set in the frame O of the machine. Passing through the end or plate $o$ of the frame O is the screw-threaded bolt D, working in the sleeve $d$ and adjusted and set at any proper position by the nut $d'$. The lower end of the screw-threaded bolt D presses upon and actuates the spring S, placed between the top plate $o$ of the frame O and the journal-box $b$. Placed between the journal-boxes $b$ and $b'$ is the spring $S'$. The action of the screw-threaded bolt D and the springs S and $S'$ is to regulate and adjust the feed-rollers A and $A'$ to the desired position and distance apart and to automatically maintain the same when the machine is in operation. Upon the axles B and $B'$ are mounted the gears $A^2$ and $A^3$, which communicate motion to the rollers A and $A'$. Mounted upon the axle B is the cog-wheel C, which communicates its motion to the gear-wheel F, mounted upon the axle $f$, revolving in suitable journal-boxes. Upon the axle $f$ are also mounted the cutter-heads or disks G, having the flanges $g$, in which are secured the detachable knives or cutters K. These knives or cutters K are constructed from parallelogram-shaped blanks or bars by cutting away one side thereof, making the cutting-edge of the knife K of oblique shape to secure a shearing cut, and thus be enabled to use two heads of exactly similar or corresponding form, the bevel of the knife-edge being on the inside and the corners of the cutting-edge being within the recess and against the wall thereof, so as to be guarded thereby as the knives revolve. These knives are attached to the flanged cutter-head G by the screw-bolts $k$ and nuts $k'$. By providing the cutter-heads with these flanges I am enabled to use the ordinary screw-bolt and nut similar to carriage-bolts for the purpose of securing the knives in position, thus rendering the knives easily adjustable and detachable, and also doing away with the use of any special form of bolt or fastening for securing the knives in position. The knives, of which there may be any suitable number, preferably four, to be mounted on the cutter-heads, are secured in the flanged recesses $g'$ at an angle, as shown in Fig. 4.

E, Fig. 4, is a horizontal plate or plane surface of steel or other proper material secured to a proper support by the set-screw $e$ and so placed in relation to the feed-rollers A and A' and cutter-heads G (oblique shaped) and knives K that the cornstalks or fodder are supported by said plate E and presented to the action of the knives K. The edge of the plate nearest to the knives K is formed into a knife-edge $e'$ and, in connection with the revolving oblique-shaped knives K, cuts the stalks or fodder to the desired fineness. Mounted upon the outer end of the axle B are the pulleys M, which are connected by suitable means with any proper source of power and operate the fodder-cutter portion of the machine.

P is a chute, through which the unhusked ears of corn pass to the corn-husking part of my machine as they are nipped from their stalks by the action of the feed-rollers A and A'.

In Figs. 5, 6, and 7 is shown the corn-husking portion of my machine, Fig. 5 being an end view looking toward the gear-wheels in Fig. 7. H H are levers, to which are attached in one casting the side guards $h\ h$. (See Figs. 5 and 7.) The levers H H are pivoted to the frame R by the bolts W, forming bearings for said levers H H, and also forming the axles for the gear-wheels $j^3$. J and J' are the inner members of the respective pairs of husking-rollers, which are made, preferably, of case-hardened steel, and which are formed in alternate convex and concave sections for the length of the rollers, as shown by the curved lines in Fig. 7. H' represents a partition bolted upon the frame R. These rollers J and J' are mounted and revolve in stationary bearings, and have attached to their axles the gear-wheels $j'$, which mesh into the gear-wheels $j^3$, mounted on bearings attached to the frame R. At the lower end of the levers H, and revolving therein as bearings, are the shifting-rollers L and L', constituting the other husking-rollers of the pair, and, being made of rawhide, molded and fitted to their shafts, which are constructed with alternate convex and concave sections for the length of the rollers. These shifting-rollers L and L' are so constructed and arranged with reference to the rollers J and J' that the concave sections of the rollers L and L' will mesh into the convex sections of the rollers J and J', and vice versa. Upon the axles of the rollers L and L' are mounted the gear-wheels $j^2$, so arranged that when the levers H are pressed inward the gear-wheels $j^2$ mesh into the gear-wheel $j^4$. Upon the axle of the rollers J and J' are also mounted the intermediate gear-wheels $j^5$, connected with the driving mechanism of the machine and communicating motion through the gear-wheels $j'$ to the gear-wheels $j^3$, and thence to the gear-wheels $j^4$, and, when by the action of the lever H the gear-wheel $j^2$ is meshed into the gear-wheel $j^4$, also communicating motion to the shifting-rollers L L'. Upon the upper ends of the levers H are placed the nuts N, through which pass loosely the bolts N', (see Fig. 6,) the inner ends of said bolts being secured to a spring placed in a cavity in said levers. The outer ends of the bolts N' press against the frame in which the corn-husking device is placed, said bolts and springs serving to automatically press and maintain the lower ends of the levers H, carrying the rollers L and L', into proper position and automatically maintaining them there while the operation of corn-husking is going on.

I have found by experiment and experience that it is preferable to make the rollers J J' of about two and one-fourth inches in diameter and the shifting-rollers L and L' of about the dimensions of three inches in diameter, and I therefore recommend rollers of these dimensions.

The operation of my machine is as follows: The stalks with the unhusked ears of corn are fed to the feed-rollers A and A' from any suitable table or support, by which rollers the ears are nipped from the stalks and thence pass through the chute P to the husking-rollers, where the ears of corn are husked by passing between the rollers. The stalks are fed by the feed-rollers A and A' between the oblique-shaped knives or cutters K and the plane table or surface E, furnished with its stationary knife-edge $e'$, and are thus cut up in the degree of fineness desired, a great or less fineness being produced by the greater or less speed of revolution of the oblique-shaped revolving cutters or knives.

If desired, the fodder-cutting portion of my machine may be dispensed with and the corn-husking portion of the invention only used, in which case the unhusked ears of corn are fed directly to the corn-husking rollers by any suitable means.

Having thus described my invention, what I claim, and desire to secure by Letters Patent, is—

1. In a cutter, the revolving cutter-heads G, provided with the flanges $g$ and recesses $g'$, in which are secured, tangentially, knives or cutters K, formed from blocks or bars having parallel edges, the cutting-edge of the knives being oblique to secure a shearing cut, the bevel of the knife-edge being on the inside and the corners of the cutting-edge being within the recess and against the wall thereof, so as to be guarded thereby as the knives revolve, substantially as described.

2. In a corn-husking machine, a pair of lever-arms connected by a side piece or guard and pivoted to the bed of the machine and having in their shorter arms bearings for one of the pairs of corn-husking rollers, said lever-arm and side piece of metal in one piece, with one or more pairs of metal husking-rollers with alternate concave and convex sections lengthwise of the rollers, substantially as described.

3. In a corn-husking machine, a pair of lever-arms connected by a side piece or guard and pivoted to the frame or bed of the machine and having in their shorter arms bearings for one of the pairs of corn-husking rollers, said lever-arm and side piece being cast or made in one piece, substantially as described.

In testimony whereof I have hereunto set my hand this 10th day of August, 1889.

JOSIAH A. WEBBER.

In presence of—
CHARLES G. COE,
R. T. VAN BOSKERCK.